(12) United States Patent
Choi et al.

(10) Patent No.: US 6,396,242 B2
(45) Date of Patent: May 28, 2002

(54) BATTERY CHARGING AND DISCHARGING SYSTEM

(75) Inventors: Gang-Hyeon Choi; Kil-Tae Park; Jong-Min Lee; Soo-Yeol Park, all of Suwon (KR)

(73) Assignee: Samsung SDI Co., Ltd., Youngin (KR)

( * ) Notice: Subject to any disclaimer, the term of this patent is extended or adjusted under 35 U.S.C. 154(b) by 0 days.

(21) Appl. No.: 09/880,074

(22) Filed: Jun. 14, 2001

(30) Foreign Application Priority Data

Jun. 14, 2000 (KR) ........................................ 2000-32699

(51) Int. Cl.$^7$ .............................. H02J 7/00; H01M 6/42
(52) U.S. Cl. ....................... 320/113; 429/149; 429/163; D13/103
(58) Field of Search ................................ 320/107, 113, 320/112, 116, 126; 429/149, 152, 156, 163; D13/103, 104, 105

(56) References Cited

U.S. PATENT DOCUMENTS

| | | | | |
|---|---|---|---|---|
| 5,886,501 A | * | 3/1999 | Marks et al. | 320/107 |
| 5,966,014 A | * | 10/1999 | Zhang et al. | 324/426 |
| 6,023,146 A | * | 2/2000 | Casale et al. | 29/623.1 |
| 6,162,559 A | * | 12/2000 | Vutetakis et al. | 429/100 |

* cited by examiner

*Primary Examiner*—Gregory Toatley
(74) *Attorney, Agent, or Firm*—Robert E. Bushnell, Esq.

(57) ABSTRACT

A battery charging and discharging system is provided. The system has a tray including a battery insertion unit having a plurality of battery insertion portions, into which battery pouches can be inserted, and holes, through which the electrodes of the battery pouches can pass, on its bottom; and a frame surrounding the edge of the battery insertion unit. The system may also have an electrode contact clip including plate springs facing each other so that they can hold an electrode protruding through a hole on the bottom of the battery insertion unit, and a base for supporting the plate springs.

20 Claims, 8 Drawing Sheets

BATTERY CHARGING AND DISCHARGING SYSTEM

CLAIM OF PRIORITY

This application makes reference to, incorporates the same herein, and claims all benefits accruing under 35 U.S.C. §119 from an application entitled Charge and Discharge System of Battery earlier filed in the Korean Industrial Property Office on Jun. 14, 2000, and there duly assigned Ser. No. 2000-32699 by that Office.

BACKGROUND OF THE INVENTION

1. Field of the Invention

The present invention relates to a battery charging and discharging system, and more particularly, to a battery charging and discharging system including a tray and an electrode contact clip that are used for charging and discharging a pouch type battery.

2. Description of the Background Art

Typically, a polymer secondary battery is manufactured by sealing electrodes assembly in a pouch formed of aluminum and then performing predetermined charging and discharging processes. The pouch includes a battery receiving portion for receiving the electrodes assembly and a gas receiving portion for receiving gas produced during battery charge and discharge. The battery receiving portion is connected to the gas receiving portion via a passage. Gas which is produced from the electrodes assembly during a battery charging and discharging process flows into the gas receiving portion. Thereafter, the gas receiving portion is cut away in a state in which the passage is shut tight.

An earlier battery charging and discharging system includes a tray having a structure of four steps. An insertion portion into which a battery pouch is inserted is formed at each step. A first battery insertion portion, a second battery insertion portion, a third battery insertion portion and a fourth battery insertion portion are formed in the tray. These battery insertion portions are arranged in tiers. Certain distances indicate the respective width of individual insertion portions. Guides are formed within each distance to guide a battery pouch to an insertion portion.

A battery pouch includes a gas receiving portion, a battery receiving portion and a cover which are integrated thereto. A gas flow passage is formed between the gas receiving portion and the battery receiving portion. A groove is formed between the gas receiving portion and the battery receiving portion. The groove corresponds to a guide of the tray so that it guides the battery pouch to any of the battery insertion portions. An electrode connected to an electrode tab of electrodes assembly is received in the battery receiving portion. When an electrode pin for applying power contacts the electrode, a battery can be charged and discharged.

In such a polymer secondary battery charging and discharging system, the tray can receive batteries at each step, i.e., a total of 32 batteries. However, since the tray receives batteries in multiple tiers, an amount of unnecessary space exists in the tray.

Moreover, when an electrode pin contacts the electrode in a state in which a battery is inserted in the tray, exact contact between the electrode and the electrode pin cannot be attained. More specifically, the electrode pin is installed to move up and down so that it can contact the electrode. The electrode pin is moved down by a driving device so that it can contact the electrode. Here, since the electrode pin contacts the electrode within the cross-sectional area of the pin electrode, reliable contact cannot be secured. In other words, since a plurality of electrode pins simultaneously move down and contact a plurality of electrodes, the probability of poor contact always exists.

SUMMARY OF THE INVENTION

It is therefore an object of the present invention to provide an improved battery charging and discharging system.

It is a another object of the present invention to provide a battery charging and discharging system having improved tray and electrode contact clip.

It is still another object to efficiently increase the area used for battery charging and discharging within a limited space.

It is still yet another object to have a battery charging and discharging system that can decrease the cost of manufacture by accommodating batteries of varying sizes.

Accordingly, in one embodiment, there is provided a battery charging and discharging system including a tray. The tray includes a battery insertion unit having a plurality of battery insertion portions, into which battery pouches can be inserted, and holes, through which the electrodes of the battery pouches can pass, on its bottom; and a frame surrounding the edge of the battery insertion unit.

To achieve the second object, preferably, the battery charging and discharging system may further include an electrode contact clip. The electrode contact clip includes plate springs facing each other so that they can hold an electrode protruding through a hole on the bottom of the battery insertion unit, and a base for supporting the plate springs.

Preferably, the top plane of the battery insertion unit is lower than the top plane of the frame, and the bottom plane of the battery insertion unit is higher than the bottom plane of the frame. Preferably, a guide corresponding to a groove of each battery pouch extends on the inside of each battery insertion portion in the lengthwise direction of the insertion portion.

In another embodiment, there is provided a battery charging and discharging system including a pocket having a battery insertion portion whose top is opened so that a battery pouch can be inserted into the battery insertion portion; and a tray including a battery insertion unit having a plurality of pocket insertion portions, into which the pocket can be inserted, and a frame surrounding the edge of the battery insertion unit.

Preferably, the battery charging and discharging system further includes an electrode contact clip including plate springs facing each other so that they can hold an electrode of the battery pouch, the electrode protruding above the pocket; and a base for supporting the plate springs.

Preferably, the pocket has a bottom insertion portion whose bottom is opened, and each pocket insertion portion of the tray has a projection extending upward from the bottom of the pocket insertion portion so that the projection can be inserted into the bottom insertion portion of the pocket. Preferably, an electrode support having a curved surface is formed at the upper portion of the pocket so that the electrode of the battery pouch can be supported by the electrode support, and a guide extending from the upper portion of the battery insertion portion toward the bottom is formed on the inside of the battery insertion portion of the pocket so that the guide corresponds to a groove of the battery pouch.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
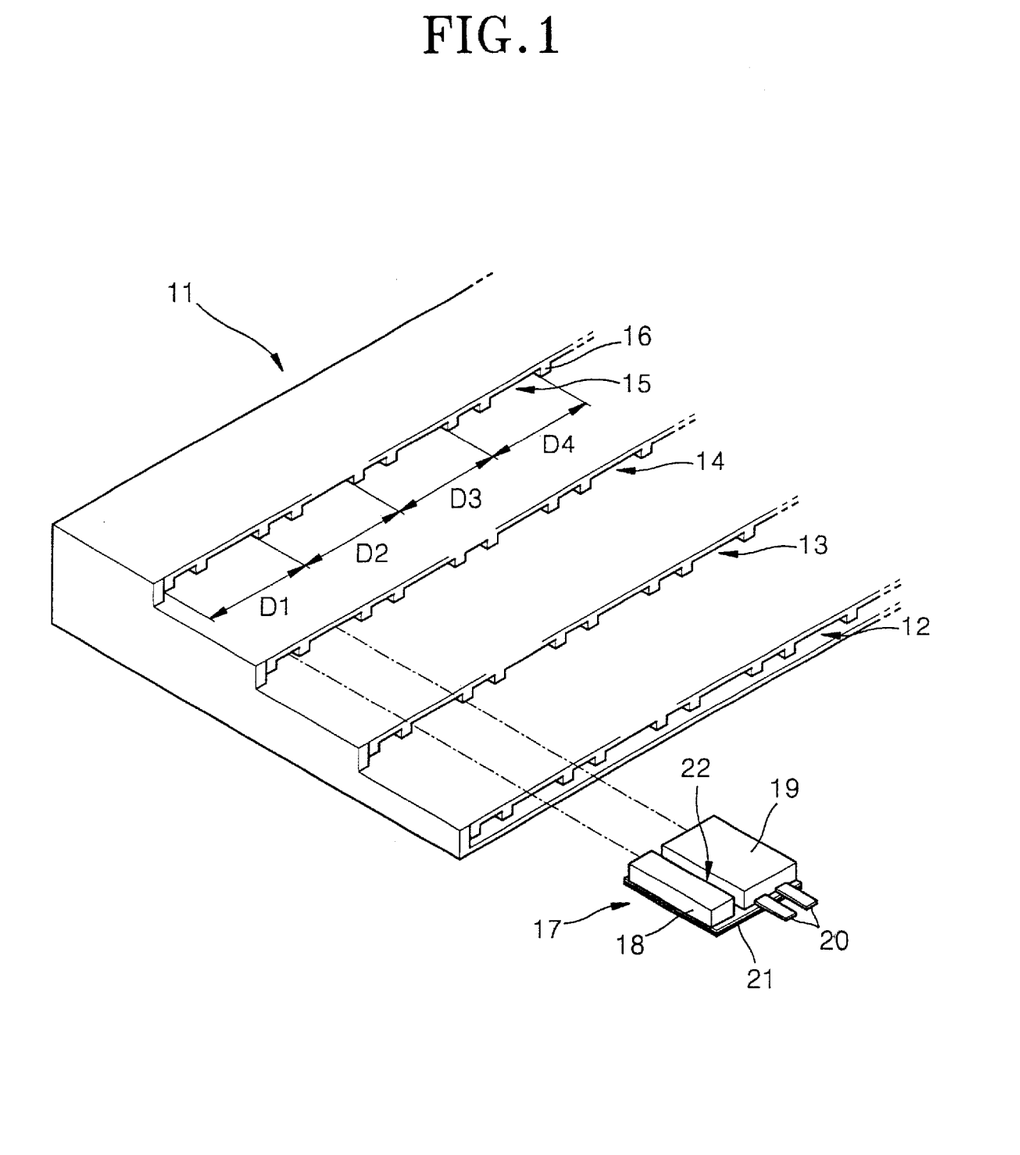
FIG. 1 is a schematic view illustrating the part of a battery insertion tray provided for an earlier battery charging and discharging system.

Turning now to the drawings, referring to FIG, 1, an earlier battery charging and discharging system includes a tray 11 having a structure of four steps. An insertion portion into which a battery pouch is inserted is formed at each step. A first battery insertion portion 12, a second battery insertion portion 13, a third battery insertion portion 14 and a fourth battery insertion portion 15 are formed in the tray 11. These battery insertion portions are arranged in tiers. Distances D1, D2, D3 and D4 indicate the respective width of individual insertion portions. Guides 16 are formed within each distance to guide a battery pouch to an insertion portion.

A battery pouch 17 includes a gas receiving portion 18, a battery receiving portion 19 and a cover 21 which are integrated thereto. A gas flow passage (not shown) is formed between the gas receiving portion 18 and the battery receiving portion 19. A groove 22 is formed between the gas receiving portion 18 and the battery receiving portion 19. The groove 22 corresponds to a guide 16 of the tray 11 so that it guides the battery pouch 17 to any of the battery insertion portions 12, 13, 14 and 15. Reference numeral 20 denotes an electrode connected to an electrode tab of electrodes assembly (not shown) received in the battery receiving portion 19. When an electrode pin (not shown) for applying power contacts the electrode 20, a battery can be charged and discharged.

In such a polymer secondary battery charging and discharging system, the tray 11 can receive 8 batteries at each step, i.e., a total of 32 batteries. However, since the tray 11 receives batteries in multiple tiers, an amount of unnecessary space exists in the tray 11.

Moreover, when an electrode pin (not shown) contacts the electrode 20 in a state in which a battery is inserted in the tray 11, exact contact between the electrode and the electrode pin cannot be attained. More specifically, the electrode pin is installed to move up and down so that it can contact the electrode 20. The electrode pin is moved down by a driving device (not shown) so that it can contact the electrode 20. Here, since the electrode pin contacts the electrode 20 within the cross-sectional area of the pin electrode, reliable contact cannot be secured. In other words, since a plurality of electrode pins simultaneously move down and contact a plurality of electrodes 20, the probability of poor contact always exists.

Figure 2A:
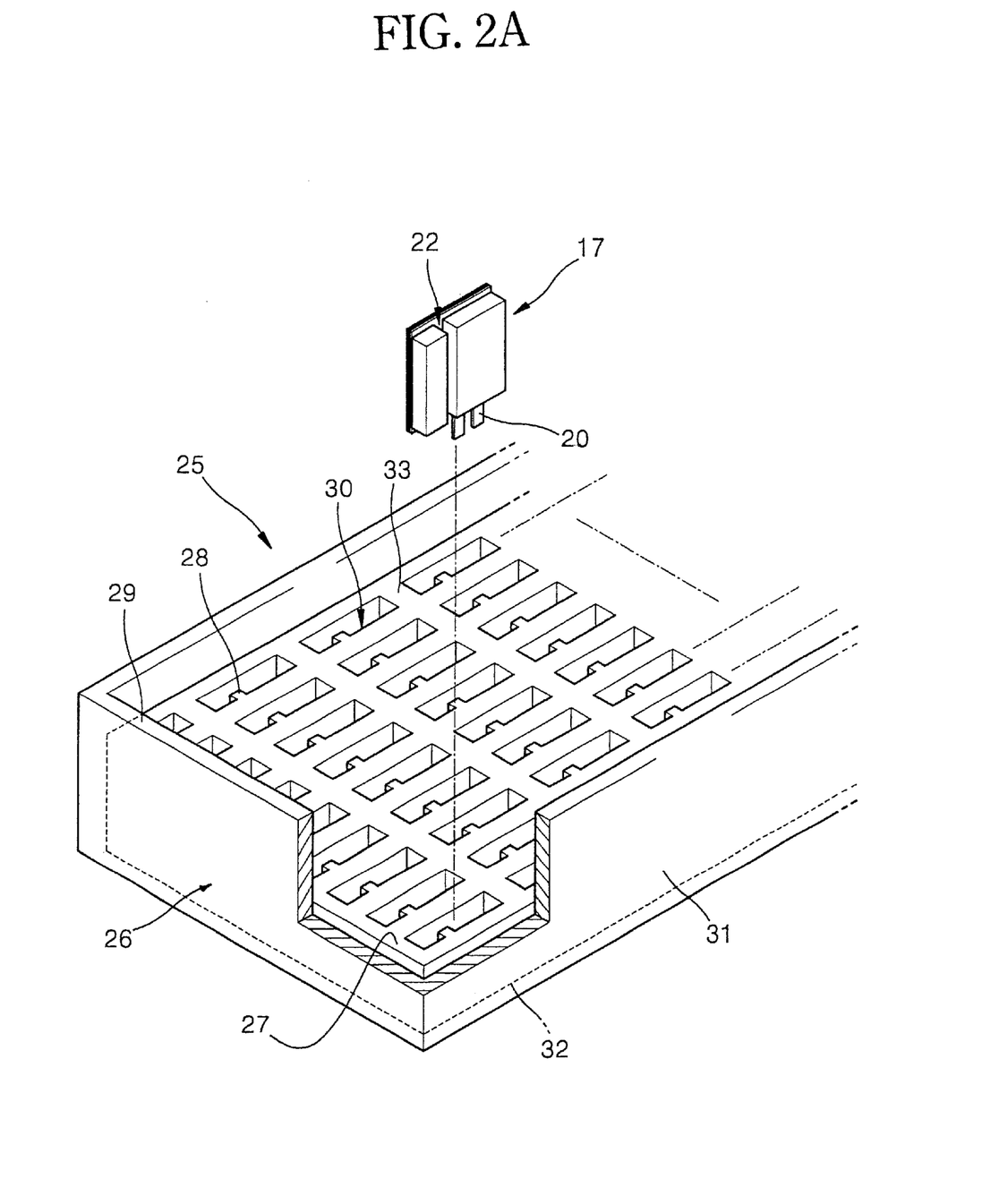
FIG. 2A is a schematic, partial perspective view illustrating an embodiment of a tray provided for a battery charging and discharging system according to the present invention.

Referring to FIG. 2A, an embodiment of a battery charging and discharging system according to the present invention includes a tray 25 having an insertion unit 33. The insertion unit 33 includes a plurality of insertion portions (or receiving chambers) 30. A battery pouch 17 with electrodes 20 facing downward can be inserted into an insertion portion 30. The battery insertion unit 33 is surrounded by a frame 26 of the tray 23. A top plane 29 of the frame 26 is higher than a top plane 27 of the insertion unit 33 having the insertion portions 30. A plurality of holes 30b are formed on the bottom 30a of each insertion portion 30. These holes are formed such that the electrodes 20 of the battery pouch 17 can pass through the holes, but the whole battery pouch 17 cannot pass through them.

Accordingly, when the battery pouch 17 are inserted into an insertion portion 30, the battery pouch 17 is supported by the bottom of the insertion portion 30 having holes, and only the electrodes 20 pass through the holes and protrude. A bottom plane 31 of the frame 26 is lower than a bottom plane 32 of the insertion unit 33, which is represented by dotted lines, so that space can exist between the bottom plane 32 of the insertion unit 33 and the bottom plane 31 of the frame 26. Therefore, the electrodes 20 protruding through the holes on the bottom of the insertion portion 30 can hang in the air without touching a ground on which the tray 25 is laid.

Figure 2B:
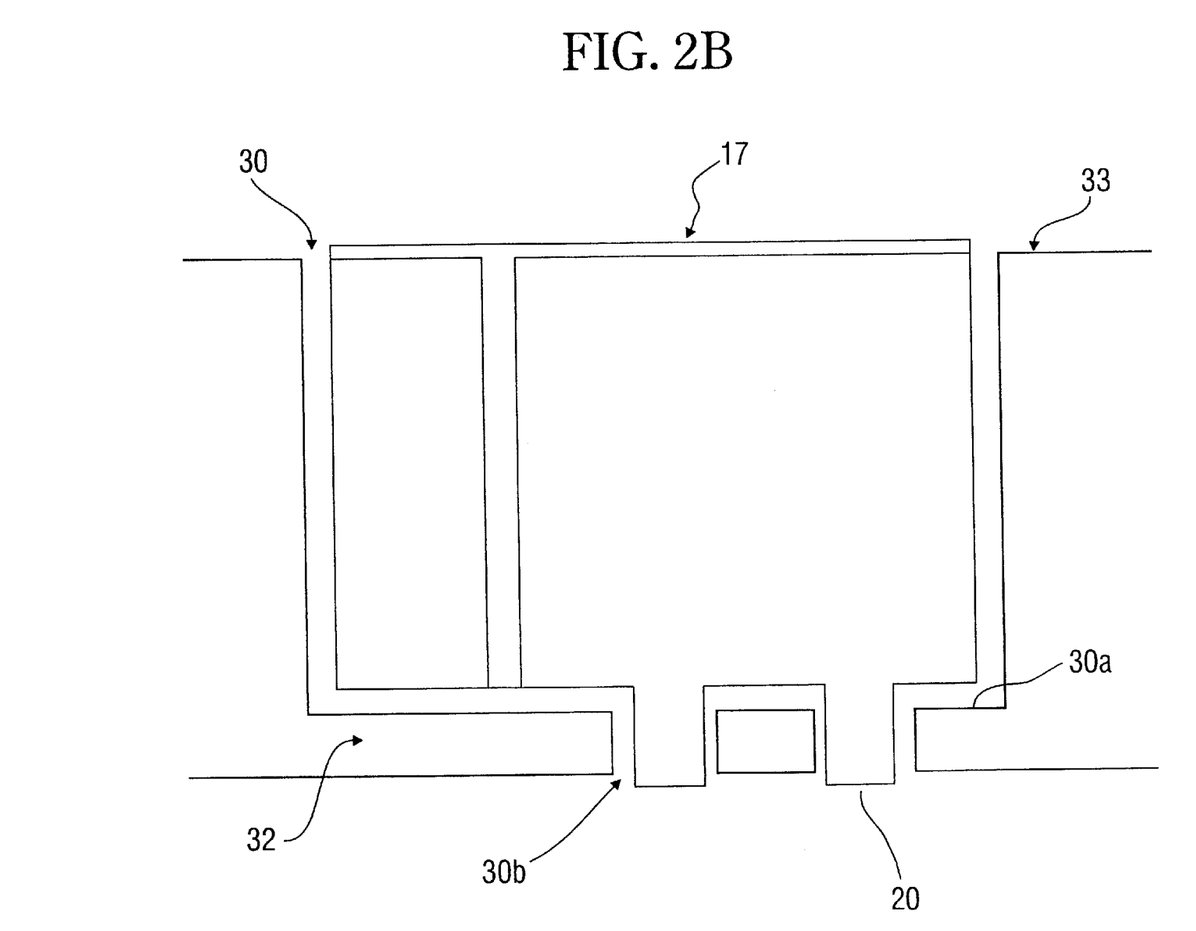
FIG. 2B is a view showing the insertion of the battery pouch in the insertion portion.

A size of the insertion portions 30 is defined to correspond to a cross-sectional area of the battery pouch 17. A guide 28 extends from the top plane 27 to the bottom of each insertion portion 30. The guide 28 corresponds to a groove 22 of the battery pouch 17. The groove 22 of the battery pouch 17 is guided downward by the guide 28 so that the battery pouch 17 is exactly inserted into the insertion portion 30 and does not shake in the widthwise direction of the battery pouch 17. In addition, the electrodes 20 can exactly pass through holes 30b on the bottom 30a of the insertion portion 30 and protrude as seen in FIG. 2B. Moreover, the position of the battery pouch 17 can be maintained in the widthwise direction regardless of a change in the width depending on the type of battery, so that the center of the battery in the widthwise direction can be positioned at a right place. In other words, since the guide corresponds to the groove 22, the battery pouch 17 can be positioned at a right place even if the width of the battery changes.

In the tray of a battery charging and discharging system shown in FIG. 2A, sixteen insertion portions 30 can be formed in the lengthwise direction, and eight insertion portions 30 can be formed in the widthwise direction, so that a total of one hundred and twenty-eight insertion portions 30 can be formed. Accordingly, a maximum of one hundred and twenty-eight batteries can be received in the tray. Here, it will be noticed that the utmost use of the space in the tray is made in addition to the increase in the number of insertion portions in the tray. Moreover, since a battery is inserted upside down, it is not necessary to prepare a different tray even if the length of the battery pouch 17 changes. In other words, even if battery pouches having different lengths are charged and discharged, the electrodes 20 of each of the different pouches sufficiently protrude through holes on the bottom of the insertion unit 33 so that charging and discharging processes can be performed on various types of battery.

Figure 3A:
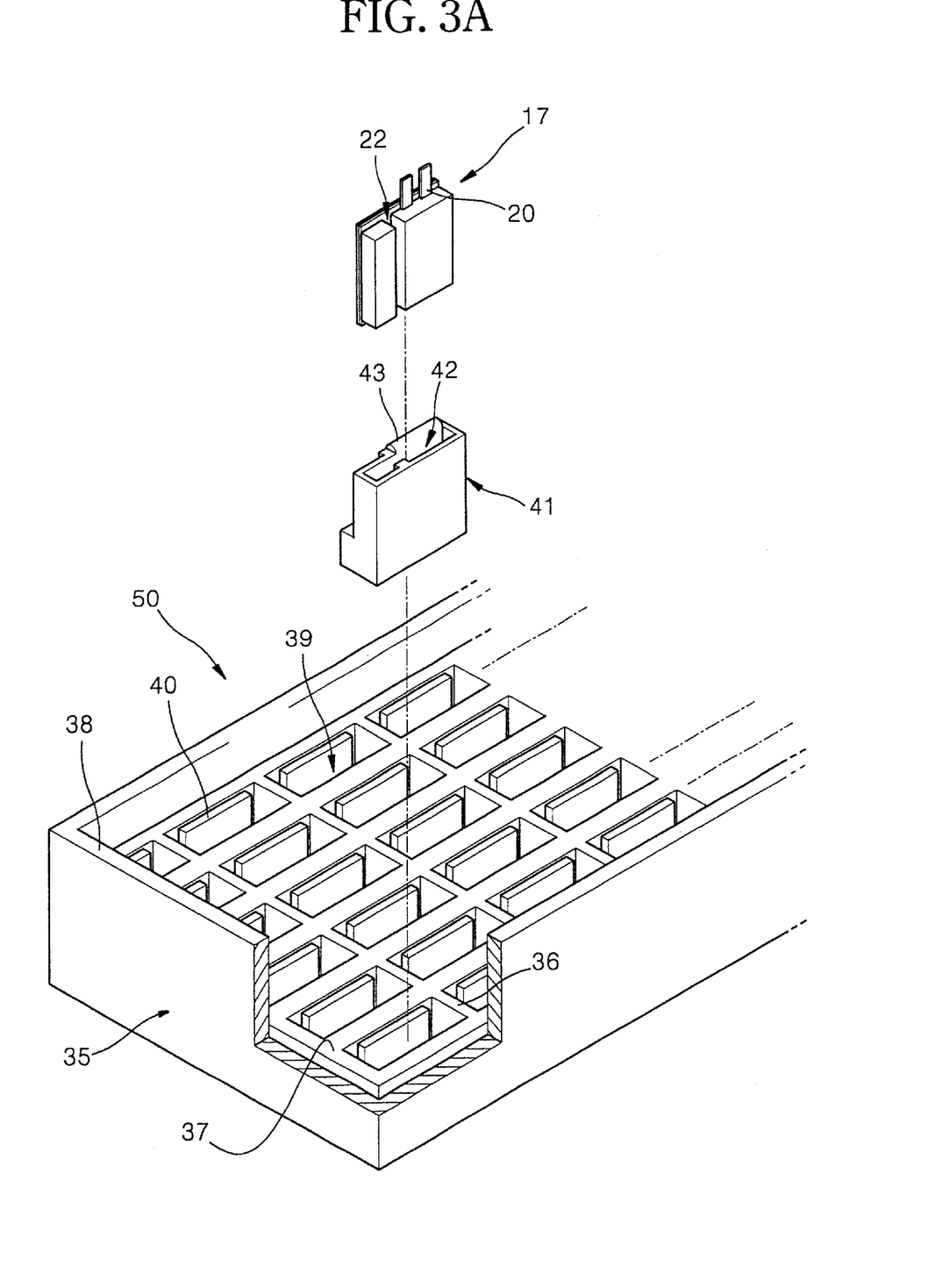
FIG. 3A is a schematic, partial perspective view illustrating another embodiment of a tray provided for a battery charging and discharging system according to the present invention.

Referring to FIG. 3A, another embodiment of a tray provided for a battery charging and discharging system according to the present invention has a tray 50 including an insertion unit 36 having a plurality of pocket insertion portions 39 and a frame 35 surrounding the insertion unit 36. The tray 50 also includes a pocket 41 which can be inserted into each of the pocket insertion portions 39. A battery pouch 17 can be received in the pocket 41. A top plane 37 of the insertion unit 36 is lower than a top plane 38 of the frame 35. A projection 40 extends upward from the bottom of each pocket insertion portion 39. The projection 40 is inserted into a hole formed on the bottom of the pocket 41 so that the pocket 41 can be steadily held within the pocket insertion portion 39.

One battery pouch 17 is inserted into an insertion portion 42 formed in the pocket 41. In the embodiment of FIG. 3A, the battery pouch 17 is inserted into the insertion portion 42 of the pocket 41 in a state in which electrodes 20 of the battery pouch 17 face upward. The insertion portion 42 of the pocket 41 can be formed to have a depth varying with the length of the battery pouch 17. Accordingly, battery pouches of various sizes can be received in the tray 50 without changing the tray 50 itself.

Figure 3B:
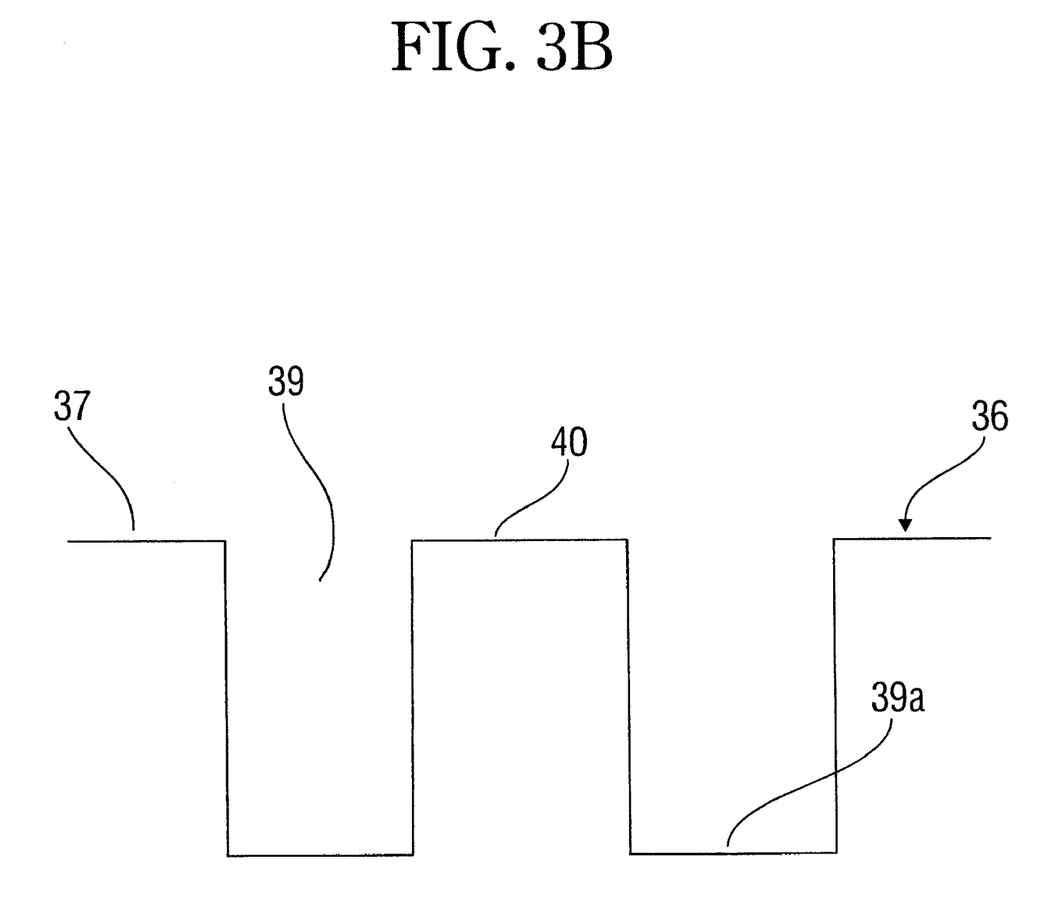
FIG. 3B is a view of the projection from the pocket insertion portion.
Figure 4:
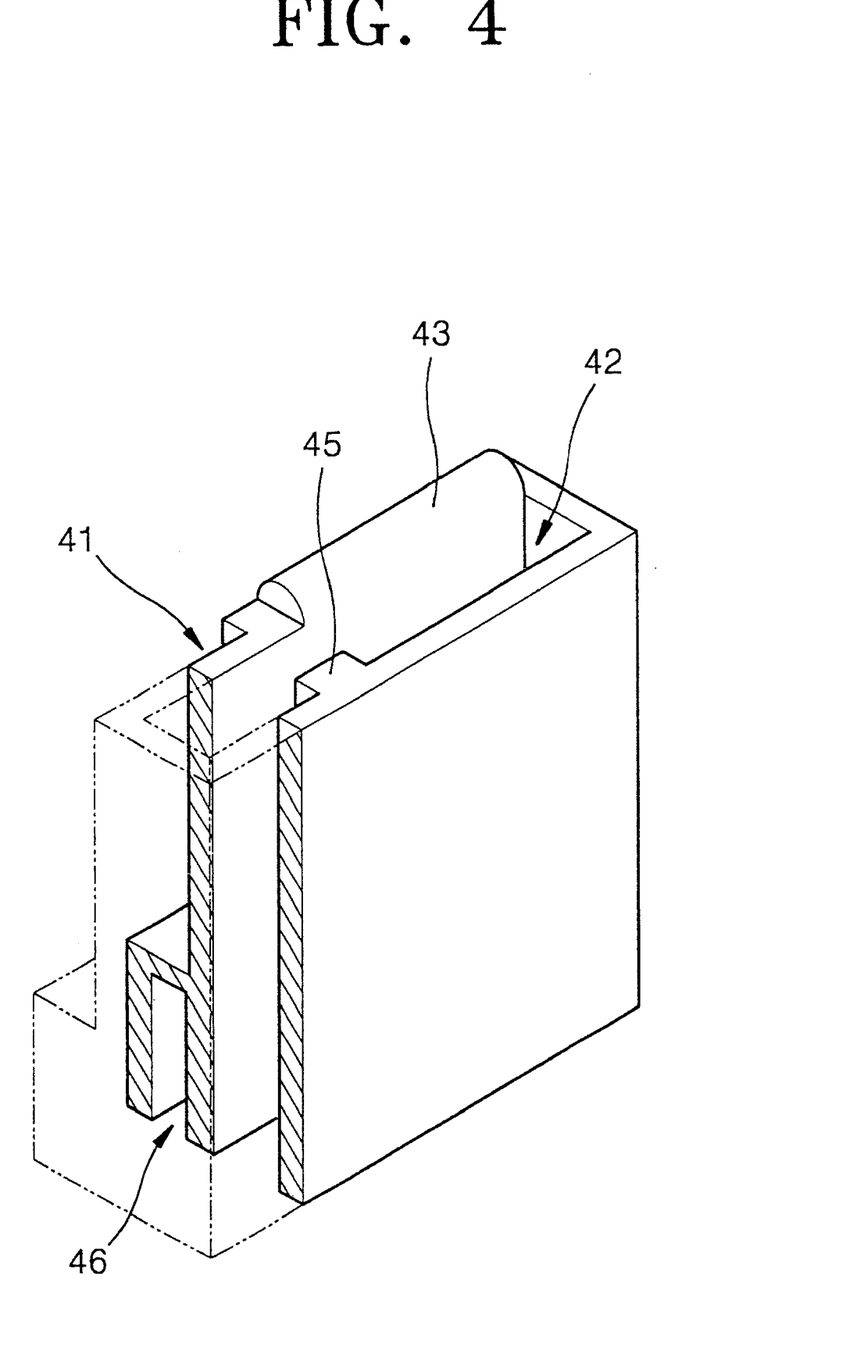
FIG. 4 is a schematic, enlarged perspective view illustrating the pocket of FIG. 3A.

FIG. 4 is a perspective view illustrating the pocket 41 of FIG. 3A. The pocket 41 includes the battery insertion portion 42 whose top is opened and a bottom insertion portion 46 whose bottom is opened. The projection 40 extending upward from the bottom 39a of the pocket insertion portion 39 of FIGS. 3A and 3B described above is inserted into the bottom insertion portion 46. A guide 45 extends downward from the top within the battery insertion portion 42. The guide 45 corresponds to the groove 22 of the battery pouch 17. When the battery pouch 17 is inserted into the battery insertion portion 42, the groove 22 is guided by the guide 45 so that the battery pouch 17 can be steadily received in the battery insertion portion 42 and does not shake in the widthwise direction thereof.

Meanwhile, an electrode support 43 is provided for supporting the electrodes 20 of the battery pouch 17. As shown in the drawing, the electrode support 43 has a curved surface. The electrodes 20 can be maintained vertically straight or to be rolled along the surface of the electrode support 4. In the latter case, the electrodes 20 formed of metal sheet is pressed against the electrode support 43 using a tool such as a roller so that the electrodes 20 can be supported by the electrode support 43 along the surface.

In the tray 50 of a battery charging and discharging system shown in FIG. 3A, sixteen pocket insertion portions 39 can be formed in the lengthwise direction, and eight pocket insertion portions 39 can be formed in the widthwise direction, so that a total of one hundred and twenty-eight pocket insertion portions 39 can be formed. Accordingly, a maximum of one hundred and twenty-eight pockets 41 receiving one hundred and twenty-eight battery pouches 17 therein can be inserted into the respective pocket insertion portions 39. In the embodiment of FIG. 3A, each of the electrodes 20 is exposed upward so that a procedure in which a power applying clip (described later in detail) or pin (not shown) contacts each electrode 20 during battery charge and discharge and that power connection can be easily attained. When an electrode contact clip is used, the electrodes 20 are maintained vertically straight. When an electrode contact pin (not shown) is used, the electrodes 20 are pressed against the electrode support 43 so that pins (not shown) can be steadily landed on the electrodes 20.

Trays and pockets as shown in FIGS. 2A and 3A can be formed of nylon using injection molding. In addition, the number of insertion portions in a tray can be variously modified.

Figure 5A:
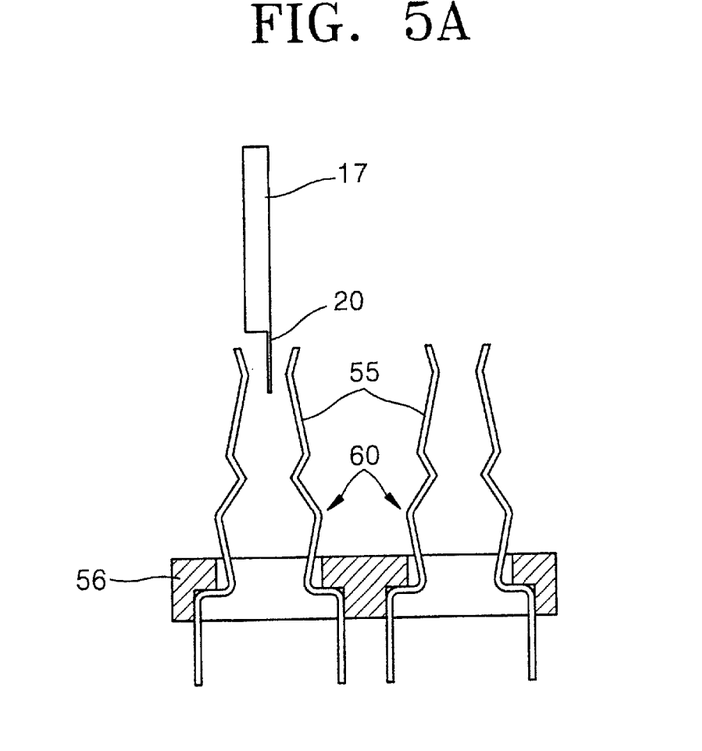
FIGS. 5A through 5C are front and side views illustrating an electrode contact clip which can be provided for a battery charging and discharging system according to the present invention.

Referring to FIG. 5A, an electrode contact clip 60 is formed by installing a pair of plate springs 55, which can engage each other, to a base 56 such that the plate springs 55 face each other. The pair of plate springs 55 facing each other can hold or release an electrode 20. One of the pairs of plate springs 55 may be used for applying current, and the other may be used for measuring voltage.

In FIG. 5A, the plate springs 55 are separated from each other by an external force. Once the plate springs 55 are separated from each other, the separated state is maintained due to their shapes. In other words, a plate spring material is bent at a predetermined angle, as shown in FIG. 5A, so that the plate springs 55 can be maintained separated.

Figure 5B:
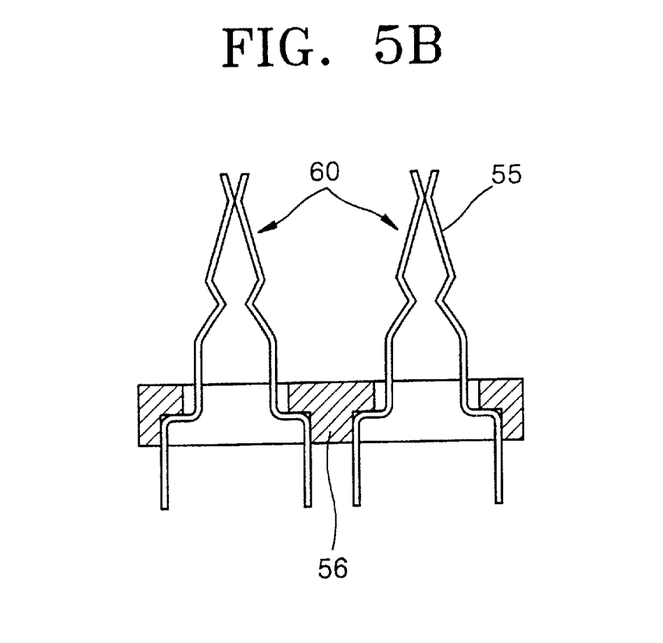

In FIG. 5B, the end portions of the plate springs 55 approach each other. When the end portions of the plate springs 55 approach each other, the plate springs 55 can hold the electrode 30 of the battery pouch 17 therebetween. Like the separated state, the approached state can be maintained due to the shape of the plate springs 55. In other words, a change in the separated or approached state of the plate springs 55 occurs only when external force is applied to the plate springs 55, and after change, the separated or approached state is maintained due to the shape of the plate springs 55.

Figure 5C:
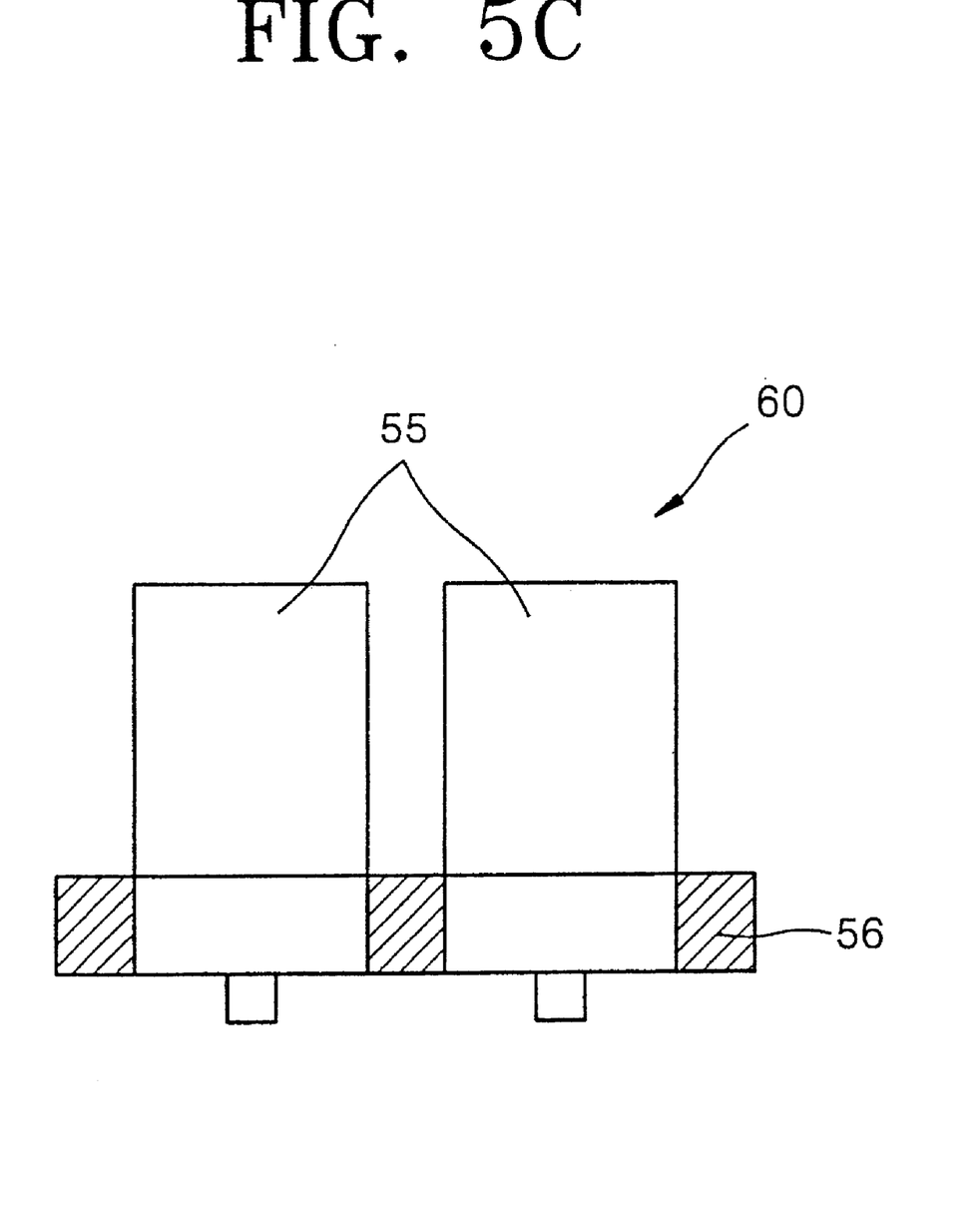

Referring to FIG. 5C, preferably, the width of each plate spring 55 is the same as or a little larger than the width of each electrode 20. By forming the plate springs 55 to be wider than each electrode 20, the electrode 20 can be fixed regardless of the type of battery.

Separation or approach of the plate springs 55 can be embodied in a variety of manners. For example, the plate springs 55 can be separated by inserting a bar between the plate springs 55 and raising it up. The plate springs 55 can be made to approach each other using a predetermined tool using an actuator.

The electrode contact clip 60 having such a structure can be used together with the trays illustrated and described in FIGS. 2A and 3A. When the battery pouch 17 is vertically inserted in the battery tray 25 upside down, the electrode contact clip 60 approaches the tray 25 from below and holds the electrode 20. In the case of battery tray 50, the electrode contact clip 60 approaches the tray 50 from above and holds the electrode 20. Alternatively, if the electrode 20 of a battery inserted into the pocket 41 of the tray 50 is supported by the electrode support 43, a typical pin can be used.

A battery charging and discharging system according to the present invention can receive the maximum number of battery pouches in a limited space and perform charging or discharging on the batteries. In addition, electrical contact between an electrode and an electrode contact portion can be steadily maintained so that the productivity of batteries can be increased.

Although the invention has been described with reference to particular embodiments, it will be apparent to one of ordinary skill in the art that modifications to the described embodiments may be made. Therefore, the true scope of the invention will be defined by the attached claims.

What is claimed is:

1. A battery charging and discharging system, comprising a tray, said tray comprising:
    a battery insertion unit having a plurality of battery insertion portions accommodating the insertion of battery pouches, and holes on the bottom of said battery insertion portions accommodating the electrodes of said battery pouches to pass through; and
    a frame surrounding the edge of said battery insertion unit.

2. The battery charging and discharging system of claim 1, further comprising an electrode contact clip, comprising:
- plate springs facing each other to hold an electrode protruding through the hole on said bottom of said battery insertion unit; and
- a base supporting said plate springs.

3. The battery charging and discharging system of claim 1, the top plane of said battery insertion unit being lower than the top plane of said frame, and the bottom plane of said battery insertion unit being higher than the bottom plane of said frame.

4. The battery charging and discharging system of claim 1, further comprising a guide corresponding to a groove of each battery pouch extending on an inside of each battery insertion portion in the lengthwise direction of said insertion portion.

5. A battery charging and discharging system, comprising:
- a pocket including a battery insertion portion, said battery insertion portion having the top being open to accommodate a battery pouch to be inserted into said battery insertion portion; and
- a tray comprising a battery insertion unit having a plurality of pocket insertion portions accommodating the insertion of said pocket, and a frame surrounding the edge of said battery insertion unit.

6. The battery charging and discharging system of claim 5, firther comprising an electrode contact clip comprising:
- plate springs facing each other to hold an electrode of the battery pouch, the electrode protruding above said pocket; and
- a base supporting said plate springs.

7. The battery charging and discharging system of claim 5, said pocket having the bottom of the bottom insertion portion being open, and each pocket insertion portion of said tray having a projection extending upward from the bottom of said pocket insertion portion, said projection being inserted into the bottom insertion portion of said pocket.

8. The battery charging and discharging system of claim 5, further comprising an electrode support having a curved surface being formed on an upper portion of said pocket accommodating the electrode of said battery pouch to be supported by the electrode support, and a guide extending from the upper portion of said battery insertion portion toward the bottom being formed on the inside of said battery insertion portion of said pocket accommodating the guide to correspond to a groove of said battery pouch.

9. The battery charging and discharging system of claim 5, the top plane of said battery insertion unit being lower than the top plane of said frame.

10. The battery charging and discharging system of claim 5, said tray and pocket formed of nylon using injection molding.

11. The battery charging and discharging system of claim 5, the width of each one of said plate springs being at least the same as the width of each electrode of said battery pouch.

12. The battery charging and discharging system of claim 5, the top portion of said battery insertion unit being flat.

13. The battery charging and discharging system of claim 5, the length of said battery insertion portions of said pockets being of varying lengths accommodating varying lengths of battery pouches.

14. A battery charging and discharging system, comprising a tray, said tray comprising:
- an insertion unit including a plurality of receiving chambers, each receiving chamber accommodating the insertion of a battery pouch through an opening on a top side of the receiving chamber; and
- a frame surrounding the edge of said insertion unit, the top plane of said insertion unit being lower than the top plane of said frame.

15. The battery charging and discharging system of claim 14, further comprising:
- a pocket including a battery insertion portion, said battery insertion portion having a top being open to accommodate said battery pouch to be inserted into said battery insertion portion, said pocket being inserted into said insertion unit; and
- a projection protruding from a bottom wall of the receiving chamber and being inserted into a bottom insertion portion of said pocket.

16. The battery charging and discharging system of claim 14, further comprising holes on the bottom wall of the receiving chambers accommodating the electrodes of said battery pouches to pass through for connection to electrical contacts.

17. The battery charging and discharging system of claim 14, the bottom wall of the receiving chambers supporting said battery pouches.

18. The battery charging and discharging system of claim 14, the bottom plane of said insertion unit being higher than the bottom plane of said frame.

19. The battery charging and discharging system of claim 14, the area of the receiving chamber corresponding to the area of said battery pouch.

20. The battery charging and discharging system of claim 14, the receiving chambers in said insertion unit being uniformly shaped and supporting battery pouches of varying lengths.

* * * * *